United States Patent [19]

Ando et al.

[11] 3,997,835
[45] Dec. 14, 1976

[54] METHOD AND APPARATUS FOR MEASURING DISTANCE

[75] Inventors: Seigo Ando, Kawasaki; Takeo Yamada, Yokohama; Katsujiro Watanabe, Tokyo, all of Japan

[73] Assignee: Nippon Kokan Kabushiki Kaisha, Tokyo, Japan

[22] Filed: Nov. 7, 1974

[21] Appl. No.: 521,812

[30] Foreign Application Priority Data

Nov. 14, 1973 Japan .................... 48-127235

[52] U.S. Cl. ............... 324/34 PS; 324/34 TK
[51] Int. Cl.[2] ....................... G01R 33/00
[58] Field of Search ......... 324/34 PS, 34 D, 34 TK, 324/41, 34 R, 40

[56] References Cited
UNITED STATES PATENTS 2,928,043  3/1960  Foerster ................. 324/34 R
3,867,689  2/1975  Mori et al. .............. 324/40

FOREIGN PATENTS OR APPLICATIONS 836,116  6/1960  United Kingdom ............ 324/34 D

*Primary Examiner*—R. V. Rolinec
*Assistant Examiner*—Ernest F. Karlsen
*Attorney, Agent, or Firm*—Ladas, Parry, Von Gehr, Goldsmith & Deschamps

[57] ABSTRACT

In measuring the distance between a measuring sensor and a metallic body, the sensor is comprised by a resonance circuit including a capacitor and a coil, and the sensor is connected to the input of a Q multiplier circuit which is impressed with an AC signal having a predetermined frequency. The non-linear distance-inductance characteristic of the coil is compensated for by adjusting the selectivity of the resonance circuit so that the amplifier included in the Q multiplier circuit produces a linear output. Such compensation is performed by adjusting the gain and/or the amount of positive feedback of the Q multiplier circuit.

10 Claims, 9 Drawing Figures

FIG. 1 PRIOR ART
FIG. 2
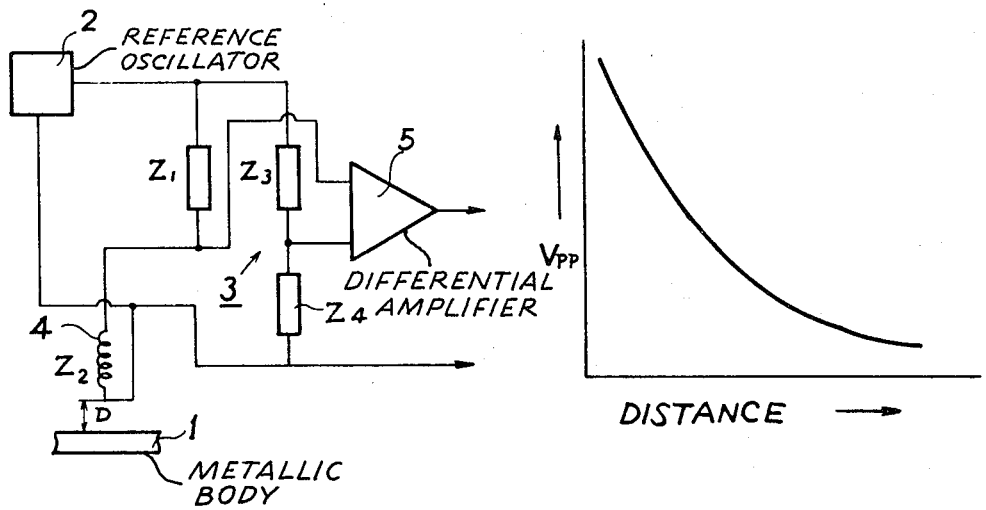
FIG. 3
FIG. 4 (a)
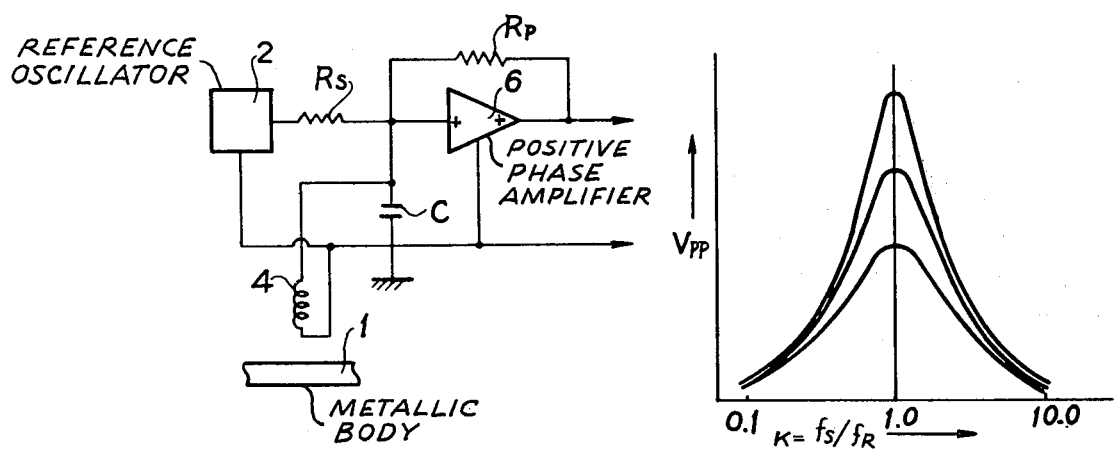

FIG. 5
FIG. 4 (b)
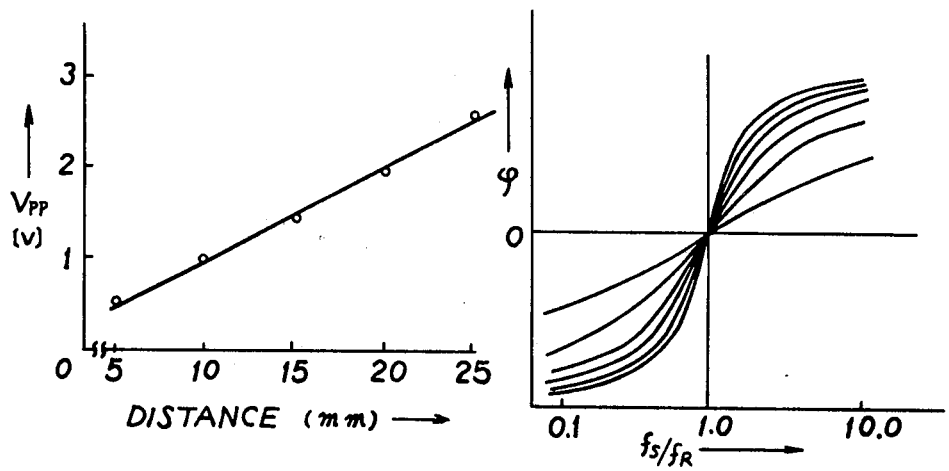
FIG. 6
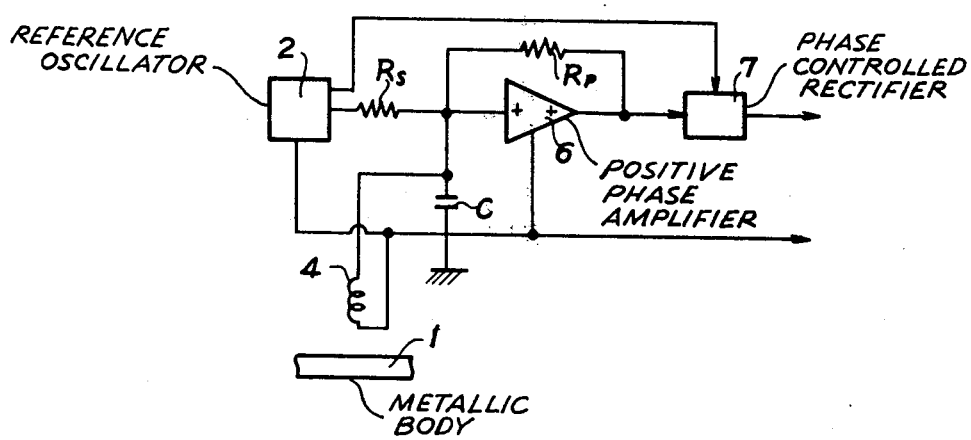

METHOD AND APPARATUS FOR MEASURING DISTANCE

BACKGROUND OF THE INVENTION

This invention relates to a method and apparatus for measuring the distance between a metallic body, for example a steel stock, and a sensor of the measuring apparatus and more particularly to a method and apparatus of the type wherein a sensor, preferably a probe type sensor constituted by a resonance circuit including a coil and a capacitor, is used and the distance between the metallic body and the sensor is measured at high accuracies without contacting the metallic body.

As a method of measuring the distance between a metallic body and measuring sensor, a method utilizing the electromagnetic induction, as diagrammatically shown in FIG. 1 has been used. More particularly a coil 4 having an impedance $Z_2$ is connected to form an AC bridge circuit 3 together with impedances $Z_1$, $Z_3$ and $Z_4$ having known impedances. The input terminals of the AC bridge circuit 3 are connected across a reference oscillator 2 having a prescribed frequency and the output of the AC bridge 3 is amplified by a differential amplifier 5. When the distance D between the coil 4 and a metallic body 1 is substantially infinite, the AC bridge circuit 3 becomes balanced when a condition $Z_1 \cdot Z_4 = Z_2 \cdot Z_3$ is satisfied as is well known in the art. Under such balanced condition, the output from the AC bridge circuit 3 is zero and hence the differential amplifier 5 produces no output. As the distance D decreases the impedance $Z_2$ of coil 4 varies with the distance D due to the variation of the self inductance caused by the electromagnetic induction in the metallic body. As is well known in the art the impedance $Z_2$ varies non-linearly with respect to the distance D. As a result, the output of the bridge circuit 3 is also non-linear. This output is amplified by the differential amplifier 5 and then supplied to an indicating meter or a recording meter, thus measuring the distance D without contacting the metallic body 1. FIG. 2 shows one example of a characteristic between distance D and the output voltage $V_{pp}$ of the differential amplifier 5.

As shown in FIG. 2, the output characteristic of such prior art measuring apparatus is non-linear. Especially, as the distance D increases, the rate of varying the output decreases, so that high accuracies can not be attained. Accordingly, it is necessary to linearize the characteristic by using a suitable external circuit. Moreover, as the change in the impedance $Z_2$ of the coil 4 with respect to the change in the distance D to the metalic body 1 is small, it is necessary to construct the bridge circuit 3 to be highly sensitive. The accuracy of the measurement is greatly influenced by the accuracy and characteristics of the fixed impedances $Z_1$, $Z_3$ and $Z_4$ so that it requires a high degree of skill to adjust the bridge circuit.

SUMMARY OF THE INVENTION

Accordingly, it is an object of this invention to provide an improved noncontact type method and apparatus capable of measuring the distance to the object to be measured at high accuracies without defects described above and having a linear output characteristic.

Another object of this invention is to provide a novel non-contact type method and apparatus for measuring the distance to the object to be measured wherein the nonlinear distance-inductance characteristic is compensated for by adjusting the frequency characteristic of a resonance circuit including the coil by controlling the sharpness Q of the resonance circuit.

Still another object of this invention is to provide an improved non-contact type method and apparatus for measuring the distance to an object to be measured capable of eliminating the measuring error caused by non-controllable variation in the sharpness of the resonance circuit due to variation of frequency.

Still another object of this invention is to provide a novel non-contact type method and apparatus for measuring the distance to an object to be measured wherein the measuring error caused by the impedance variation of the resonance circuit caused by temperature variation is greatly decreased.

According to the novel method of measuring distance of this invention, a coil which constitutes a resonance circuit together with a capacitor is disposed to confront a metallic body to be measured, the self inductance of the coil which is determined in accordance with the distance between the coil and the metallic body is compared with the reference self inductance of the coil when the coil is positioned at a reference point (for example a point at substantially infinite distance from the metallic body) for the purpose of deriving out the difference in terms of the variation in the resonance frequency of the resonance circuit, and an AC signal having the same frequency as the reference resonance frequency of the resonance circuit and supplied from a reference oscillator is supplied to a Q-up circuit coupled with the resonance circuit whereby the variation in the output corresponding to the variation in the resonance frequency of the resonance circuit is derived out as the distance measuring signal. Further, the non-linearity of the distance-inductance characteristic is compensated for by adjusting the sharpness Q of the resonace circuit by varying the gain and/or the amount of positive feedback of the Q multiplier circuit such that the impedance or phase-frequency characteristic of the resonance circuit will have a complementally non-linear characteristic that compensate for the non-linearity of the distance-inductance characteristic. In this manner, since this method can measure continuously the distance between a metallic body and measuring sensor it can be used in a variety of applications such as detection of the position of steel stocks in a production line, detection of the extent of bending of long steel stocks inspection of the contour of metal strips, etc.

According to this invention, since the variation in the self inductance of the coil caused by the variation in the distance between the coil and the metallic body to be measured is detected, the degree of the variation in the self inductance of the coil varies depending upon the material of the metallic body. However, such measurement is generally made for a long period for a definite material as in the case of working steel stocks or rolling of steel strips so that once the apparatus has been calibrated for a predetermined material it can be used to other materials by merely adjusting the calibration for the particular material. Moreover, as the difference in the composition or species of steel stocks does not result in any appreciable difference in the magnetic property, even when the apparatus is used for steels of different types processed in the same working line the measuring error is negligibly small.

Further, in accordance of this invention there is provided a distance measuring apparatus of the type wherein the distance between a coil and a metallic body is measured in term of the variation in the impedance of the coil, characterized in that there are provided a capacitor connected to cooperate with the coil to form a resonance circuit, a reference oscillator for generating an AC signal of a predetermined frequency, means to apply the AC signal to the resonance circuit, a Q multiplier circuit coupled to the reference oscillator and the resonance circuit, and means for adjusting the gain or the amount of the positive feedback of the Q multiplier circuit so as to equivalently adjusting the sharpness of the resonance circuit thereby linearizing the non-linear characteristic between the variation in the distance and the variation in the impedance of the coil.

Preferably, the Q multiplier circuit comprises an amplifier having an inverting input terminal connected to the reference oscillator and a non-inverting input terminal connected to the resonance circuit, a negative feedback circuit connected between the output of the amplifier and the inverting input terminal thereof, and a positive feedback circuit connected between the output of the amplifier and the non-inverting input terminal thereof.

BRIEF DESCRIPTION OF THE DRAWINGS

Further objects and advantages of the invention can be more fully understood from the following detailed description taken in conjunction with the accompanying drawings in which:

FIG. 1 is a block diagram showing the construction of a prior art non-contact type distance measuring apparatus utilizing an electromagnetic induction coil and an AC bridge circuit;

FIG. 2 is a graph showing the output characteristic of the apparatus shown in FIG. 1;

FIG. 3 is a block diagram showing the basic construction of the novel measuring apparatus of this invention;

FIG. 4a is a graph showing the impedance-frequency characteristics of a resonance circuit;

FIG. 4b is a graph showing the phase-frequency characteristics of the resonance circuit;

FIG. 5 is a graph showing the output characteristic of the measuring apparatus embodying the invention; and FIGS. 6, 7 and 8 show block diagrams of different embodiments of this invention.

DESCRIPTION OF THE PREFERRED EMBODIMENTS

Figure 7:
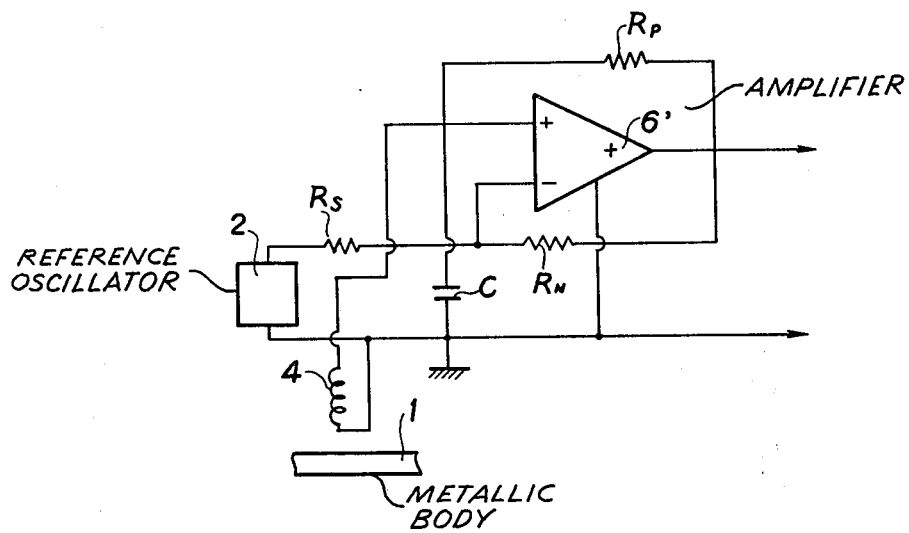

Referring now to FIG. 3 showing the basic construction of the measuring apparatus of the invention components similar to that shown in FIG. 1 are designated by the same reference characters. Thus, a coil 4 is disposed to confront a metallic body 1 to be measured, and a capacitor C is connected in parallel with coil 4 to form a resonance circuit having an inherent reference resonance frequency which is determined by the reference inductance of the coil 4 (that is the self-inductance of the coil when it is not coupled with the metallic body 1), and a predetermined capacitance of the capcitor C. There are provided a reference oscillator 2 for supplying to the resonance circuit an AC signal having the same frequency as the reference resonance frequency and a positive phase amplifier 6 which constitutes a Q multiplier circuit together with a positive feedback resistor $R_P$. The reference oscillator 2 is connected to the resonance circuit and the Q multiplier circuit through a series resistor $R_S$. Although in FIG. 3, the Q multiplier circuit is shown as comprising a positive feedback amplifier having the same basic construction as a parallel two terminal type oscillation circuit comprising a positive phase amplifier and a positive feedback circuit it is also possible to use a Q multiplier circuit wherein any one of many well known oscillators, such as series two terminal type oscillation circuit, anode (collector) resonance type, grid (base) resonance type, Hartley type, Colpitts type or push-pull type oscillator is used as a negative resistance circuit, not as an oscillator. The Q multiplier circuit utilized in this invention is required to be able to vary or adjust the gain and or the amount of positive feedback as will be described hereinafter.

In the apparatus shown in FIG. 3, when the distance D between the coil 4 and the metallic body 1 is made to be substantially infinite (or the coil 4 is not couple with the body 1) and when an AC signal having a definited frequency and definite amplitude is supplied to the resonance circuit from the reference oscillator 2 through series resistor $R_S$ the output of the resonance circuit is amplified by the positive phase amplifier 6 and a portion of the output thereof is positively fed back to the input of the amplifier through positive feedback resistor $R_P$. Let us denote the oscillation frequency of the reference oscillator 2 by $f_S$, and the resonance frequency of the resonance circuit by $f_R$. When the oscillation frequency is adjusted such that the ratio $K = f_S/f_R$ will be in a range of from 0.1 to 10.0, then impedance-frequency characteristics of the resonance circuit as shown in FIG. 4a can be obtained by measuring the output voltage of the positive phase amplifier 6 with respect to the ratio K. The impedance $Z_2$ of the coil 4 is expressed by an equation $Z_2 = R_0 + jX$ (where $R_0$ represents the resistance of the coil and X represents the reactance thereof) and the sharpness Q of the resonance circuit is expressed by an equation $Q = X/R_0$. Accordingly, it is possible to select any value for selectivity Q by varying the value of resistance $R_0$. Actually, however, coil 4 has a certain resistance, and it is impossible to reduce it to zero. However, for the purpose of compensating for the effective resistance of the resonance circuit is an external Q-up circuit is provided it would be possible to vary the input impedance of the Q multiplier circuit from infinity to a negative value by varying the gain of the Q multiplier circuit and/or the amount of the positive feedback. Thus the sharpness Q of the resonance circuit can be adjusted to any desired value. FIG. 4a shows the impedance-frequency characteristics of the resonance circuit for various sharpness Q.

As the coil 4 is brought closer to the metallic body 1 the self-inductance of coil 4 increases non-linearly as described above. Theoretically, the resonance frequency of the resonance circuit varies non-linearly with the variation of the inductance. Actually, however, as the variation of the impedance is very small it can be considered that the resonance frequency varies in proportion to the inductance. Accordingly, the ratio K is maintained in a range of from 1.0 to 10.0 and varies near 1.0.

For the reason described above, the variation of the impedance near the resonance frequency causes a large variation of the resonance current or voltage due to the non-linear characteristic of the resonance circuit and since this non-linearlity is opposite to the non-linear characteristic of the inductance variation with respect to the variation of the distance of the coil 4, it is possible to obtain a substantially linear output characteristic if these two characteristics are made to be complementally with each other by suitably adjusting the sharpness Q of the resonance circuit by adjusting the gain and/or the amount of positive feedback of the Q multiplier circuit. FIG. 5 shows one example of the distance-output characteristic of the embodiment described above.

Although in the foregoing embodiment, the desired output characteristic was obtained by utilizing the impedance variation of the resonance circuit it is also possible to obtain the desired output characteristic by utilizing the phase variation of the resonance circuit. As is well known in the art the phase-frequency characteristics of a resonance circuit for different values of sharpness Q can be shown by curves shown in FIG. 4b wherein the phase of the resonance current or voltage varies as the frequency departs from the resonance frequency. By deriving out such variation as the variation in voltage or current it is possible to make similar measurement.

As shown in FIG. 4b, the phase-frequency characteristics of the resonance circuit vary greatly near the resonance frequency. By analyzing this phase variation by using the phase of the AC signal produced by the reference oscillator as the reference it is possible to obtain the measured output. For example, the measured output can be derived out through a phase controlled rectifier 7, as shown in FIG. 6.

By denoting the AC signal voltage from the reference oscillator 2 by $E_S \sin\omega t$ and the output voltage of the positive phase amplifier 6 by $E_R \sin(\omega t + \phi)$, the output voltage $E_O$ of the synchronous detector 7 can be shown by an equation $E_O = E_R \cos\phi$, where $\phi$ represents the phase difference. After coinciding the oscillation frequency $f_S$ of the reference oscillator 2 with the resonance frequency $f_R$ of the resonance circuit, under a condition in which the distance between the coil 4 and the metallic body 1 is substantially infinite, as the distance is decreased the phase of the output from the positive phase amplifier 6 varies in accordance with the characteristics shown in FIG. 4b. As a consequence, the output voltage from the phase controlled rectifier 7 varies in accordance with a combined characteristic of the variation characteristic of the impedance of coil 4 and the phase-frequency characteristic of the resonance circuit. As before it is possible to adjust the sharpness Q of the resonant circuit by suitably selecting the gain and/or the amount of the positive feedback of the Q multiplier circuit thus adjusting the overall characteristic to be linear. Where the output is obtained by phase analysis in this manner, as the characteristic becomes independent of the amplitude of the output signal it is possible to completely eliminate the effect of external disturbance upon the amplitude by using a suitable wave shaping circuit.

Where an AC signal applied to the resonance circuit from the reference oscillator 2 through series resistor $R_S$ as shown in FIGS. 3 and 6, this resistor R acts as a parallel resistance for the resonance circuit thus decreasing the sharpness Q of the resonance circuit. Where a DC potential presents at the output terminals of the reference oscillator 2, it is necessary to apply the AC signal voltage to the resonance circuit through a capacitor which blocks the flow of direct current. However, if the temperature characteristic of such capacitor were not excellent, the resonance frequency of the resonance circuit would vary with temperature.

For the purpose of eliminating this defect, in the embodiment shown in FIG. 7, the AC signal from the reference oscillator 2 is applied to the amplifier 6' through the resonance circuit and input circuit, respectively. More particularly, the AC signal applied to the inverting input terminal of the amplifier 6' from the reference oscillator 2 through series resistor $R_S$ is amplified by the amplifier 6' to a predetermined value and a portion of the output is negatively fed back to the inverting input terminal through a negative feedback resistor $R_N$ and positively fed back to the non-inverting input terminal through a positive feedback resistor $R_P$. The non-inverting input terminal is coupled to the resonance circuit constituted by coil 4 and capacitor C. The reference resonance frequency is determined to a predetermined value as in the embodiment shown in FIG. 3. In this embodiment, the Q multiplier circuit is constituted by amplifier 6' and the positive and negative feedback resistors $R_P$ and $R_N$ so that the sharpness of the resonance circuit can be equivalently adjusted to any value by adjusting the gain by varying resistor $R_N$ and or by adjusting the amount of positive feedback by varying resistor $R_P$. Accordingly, in the modified embodiment shown in FIG. 7 too, by adjusting the sharpness Q so as to compensate for the non-linearity of the inductance variation characteristic of the coil 4, it is possible to make linear the output characteristic of the amplifier 6' as shown in FIG. 5 even when the distance between the coil 4 and the metallic body 1 varies. Moreover, as the input circuit of the AC signal and the resonance circuit are coupled to the Q multiplier circuit through perfectly isolated circuits it is possible to eliminate various problems described above. It is also possible to isolate the input circuit of the AC signal from the resonance circuit by coupling the AC signal to the output terminals of the amplifier 6'.

It is also important to prevent decrease of the measuring accuracy caused by the variation in the sharpness Q and the resonance frequency of the resonance circuit constituted by coil 4 and capacitor C due to temperature variation.

As is well known in the art, the impedance $Z_2$ of coil 4 varies with its temperature and where the coil 4 is sufficiently spaced from the metallic body 1, the impedance $Z_2$ is expressed by an equation $$Z_2 = R_o + \Delta R_t + j\omega(L_o + \Delta L_t)$$

where $R_o$ and $L_o$ represent the resistance and inductance of the coil at a reference temperature and $\Delta R_t$ and $\Delta L_t$ the incremental variations of the resistance and inductance of the coil when the temperature varies by $t$ °C. Accordingly, even when the distance between the coil 4 and the metallic body 1 is equal to the initially set value or substantially infinite the temperature variation results in the variations in the sharpness and the resonance frequency of the resonance circuit thereby decreasing the accuracy of the measurement.

Figure 8:
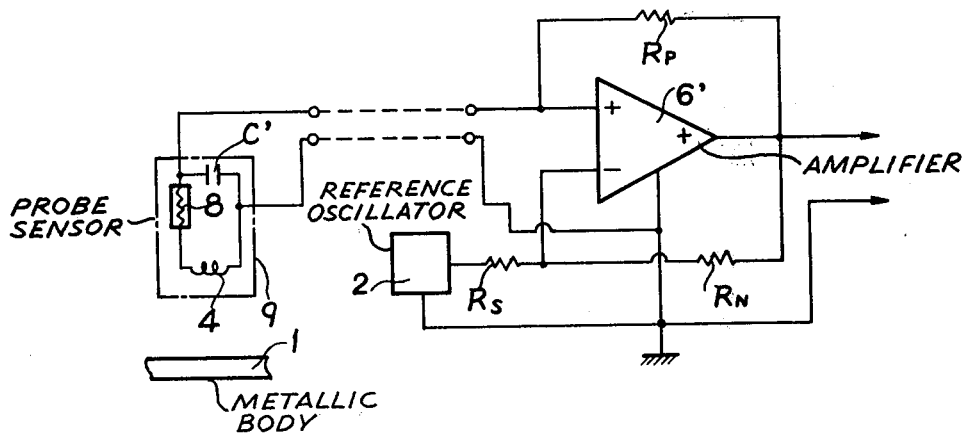

In another embodiment shown in FIG. 8, for the purpose of obviating the problem described above, a resonance capacitor C' having a negative temperature characteristic, a temperature sensitive resistance element 8 having a negative temperature characteristic, for example a thermistor, and a coil 4 are assembled into a unitary probe type sensor 9 which is connected to the positive feedback circuit of the amplifier 6' through a coaxial cable or the like. Since the coil 4 has a positive temperature characteristic, the temperature sensitive element 8 having negative characteristic functions to compensate for the real portion of the impedance of the coil 4 whereas the capacitor $c'$ having negative characteristic functions to compensate for the imaginary portion thereby eliminating variation in the characteristics of the coil 4 caused by temperature variations. In this manner it is possible to measure the distance at high accuracies independent of any temperature variation. It will be clear that the same object can be attained when the sensor 9 is connected to the negative feedback circuit of the amplifier $6'$.

As has been described above, the invention provides an improved distance measuring apparatus of simple circuit construction yet having high sensitivity and high accuracy. Moreover, the apparatus can provide an output characteristic of excellent linearity without using any external circuit acting as a linearizer, and has wider measuring ranges than conventional measuring apparatus. Accordingly, the apparatus is suitable for use in many measuring or detecting applications of metallic bodies such as detection of the position, detection of bending or contour of metal articles.

Although the invention has been shown and described in terms of some preferred embodiments it should be understood that many changes and modifications may be made without departing from the true spirit and scope of the invention as defined in the appended claims.

What is claimed is:

1. In a method of measuring the distance between a coil and a metallic body to be measured of the type wherein the distance is measured in terms of the variation in the impedance of said coil caused by the variation in said distance, the improvement which comprises the steps of connecting a resonance circuit constituted by said coil and a capacitor to the input side of a Q multiplier circuit, applying an AC signal having a predetermined frequency to said Q multiplier circuit, and adjusting the impedance or frequency characteristic of said resonance circuit by varying the gain of said Q multiplier circuit thereby equivalently adjusting the sharpness of said resonance circuit so as to compensate for the non-linear distance-inductance characteristic of said coil thereby linearizing the variation of the measuring output of said Q multiplier circuit.

2. The method according to claim 1 wherein the variation in the output signal produced by phase analyzing said output is linearized.

3. The method according to claim 1 wherein said AC signal and the output from said resonance circuit are applied to said Q multiplier circuit through independent input circuits.

4. Distance measuring apparatus comprising a coil adapted to be disposed to confront a metallic body to be measured, a capacitor which cooperates with said coil to form a resonance circuit, a reference oscillator for generating an AC signal having a predetermined frequency, means to apply said AC signal to said resonance circuit, a Q multiplier circuit coupled to said reference oscillator and said resonance circuit, and means for adjusting the gain of said Q multiplier circuit so as to equivalently adjust the sharpness of said resonance circuit thereby linearizing the non-linear characteristic between the variation in the distance between said coil and said metallic body and the variation in the inductance of said coil.

5. The apparatus according to claim 4 wherein said Q multiplier circuit is coupled to said reference oscillator and said resonance circuit through input circuits which are isolated from each other.

6. The apparatus according to claim 4 wherein said AC signal produced by said reference oscillator has a frequency equal to the inherent resonance frequency of said resonance frequency when said coil is not electromagnetically coupled with said metallic body.

7. The apparatus according to claim 4 wherein said Q-up circuit comprises a positive phase amplifier provided with a positive feedback circuit.

8. The apparatus according to claim 4 wherein the output of the Q multiplier circuit is coupled to a phase controlled rectifier through a wave shaping circuit which functions to make constant the amplitude of said output, said phase controlled rectifier producing an output signal in accordance with the variation of the phase of said output with reference to the phase of the AC signal produced by said reference oscillator.

9. The apparatus according to claim 4 wherein said resonance circuit comprises a combination of a temperature sensitive resistance element having a negative temperature characteristic selected to have an impedance-temperature characteristic which is complementally to that of said coil, a capacitor and said coil.

10. The apparatus according to claim 4 wherein said Q multiplier circuit comprises an amplifier having an inverting input terminal connected to said reference oscillator and a non-inverting input terminal connected to said resonance circuit, a negative feedback circuit connected between the output of said amplifier and said inverting input terminal, and a positive feedback circuit connected between the output of said amplifier and said non-inverting input terminal.

* * * * *

UNITED STATES PATENT AND TRADEMARK OFFICE
CERTIFICATE OF CORRECTION

PATENT NO. : 3,997,835

DATED : December 14, 1976

INVENTOR(S) : ANDO, Seigo et al

It is certified that error appears in the above-identified patent and that said Letters Patent are hereby corrected as shown below:

At column 8, line 22, "frequency" should read -- circuit --.

Signed and Sealed this

Twenty-ninth Day of November 1977

[SEAL]

Attest:

RUTH C. MASON
Attesting Officer

LUTRELLE F. PARKER
Acting Commissioner of Patents and Trademarks